United States Patent [19]
Filla et al.

[11] Patent Number: 5,894,179
[45] Date of Patent: Apr. 13, 1999

[54] MOTOR WITH STRATEGICALLY PLACED CONNECTOR BLOCK

[75] Inventors: John J. Filla, Ballwin; Paul G. Michaels, Arnold, both of Mo.

[73] Assignee: Emerson Electric Co., St. Louis, Mo.

[21] Appl. No.: 08/991,969

[22] Filed: Dec. 17, 1997

[51] Int. Cl.$^6$ .................................. H02K 11/00; H02K 5/00
[52] U.S. Cl. .................................................. 310/71; 310/89
[58] Field of Search ................................ 310/71, 88, 89, 310/42, 258

[56] References Cited

U.S. PATENT DOCUMENTS

| | | | |
|---|---|---|---|
| 2,942,125 | 6/1960 | Schaefer per doc. | 310/71 |
| 3,457,442 | 7/1969 | Charlton et al. | 310/71 |
| 3,482,128 | 12/1969 | Keck et al. | 310/71 |
| 3,483,408 | 12/1969 | Frohmuller et al. | 310/71 |
| 3,502,917 | 3/1970 | Bizoe | 310/71 |
| 3,979,615 | 9/1976 | Neff | 310/71 |
| 4,004,169 | 1/1977 | Charlton | 310/71 |
| 4,904,893 | 2/1990 | Snider et al. | 310/260 |
| 5,175,458 | 12/1992 | Lemmer et al. | 310/71 |
| 5,543,671 | 8/1996 | Williams | 310/71 |

*Primary Examiner*—Nestor Ramirez
*Assistant Examiner*—Dang Dinh Le
*Attorney, Agent, or Firm*—Howell & Haferkamp, L.C.

[57] ABSTRACT

An electric motor comprising a stator having first and second ends and a cross section and a connector block mounted on one end of the stator, substantially entirely within the cross-sectional profile of the stator. The connector block has a plurality of electrical contacts oriented generally transversely outwardly with respect to the stator. An end shield is mounted over the end of the stator, overlying the top of the connector block. The end shield is spaced sufficiently from the stator in the vicinity of the connector block to allow free access to the electrical contacts of the connector block from the transverse direction.

11 Claims, 2 Drawing Sheets

MOTOR WITH STRATEGICALLY PLACED CONNECTOR BLOCK

FIELD OF THE INVENTION

This invention relates to electric motors, and in particular to the strategic positioning of a connector block on an electric motor.

BACKGROUND OF THE INVENTION

Connector blocks are used on electric motors to speed installation and proper connection of the electric motor. These blocks are prominently placed on the electric motor so that the block can be easily accessed. However, motors are frequently handled with robotic equipment, and exposed connector blocks are vulnerable to damage. Even when handled manually, exposed connector blocks are vulnerable to damage while the motor is being handled and installed.

SUMMARY OF THE INVENTION

The present invention relates to an electric motor that has a readily accessible connector block that is protected from damage during handling. Generally, this motor comprises a stator having first and second ends and a transverse cross-sectional profile. A connector block is mounted on one end of the stator, within the cross-sectional profile of the stator. The connector has a plurality of open compartments oriented with the openings facing generally transversely with respect to the longitudinal axis of the stator. A plurality of electrical sockets and contacts are mounted in the compartments. An end shield is mounted over the end of the stator. The end shield overlies the top of the connector block, but is spaced sufficiently from the stator in the vicinity of the connector block to allow free access to the electrical sockets and contacts in the compartments in the connector block from the transverse direction. The end shield preferably flares in the vicinity of the connector block to create an opening for accessing the connector block.

The connector block is preferably positioned on the stator at a split in the windings so there is more room on the surface to accommodate the connector block. Particularly in a two pole or three pole motor, there is sufficient room on the stator between the windings of each pole to accommodate the depth of the connector block. Placing the connector block in this location allows the connector block to remain within the transverse cross-sectional profile of the motor without the need to make the stator larger to accommodate the connector.

The electric motor of this invention has a connector block for fast and convenient connection of the electric motor. The connector block is readily accessible, yet remains protected within the profile of the stator and under the end shield. Because of this strategic positioning of the connector block, the connector block is less likely to be damaged than the connector block on a conventional motor. Moreover, because of the strategic positioning of the connector in the space between the windings of adjacent poles, this can be accomplished without adding additional material to the stator to accommodate the connector block.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 2:
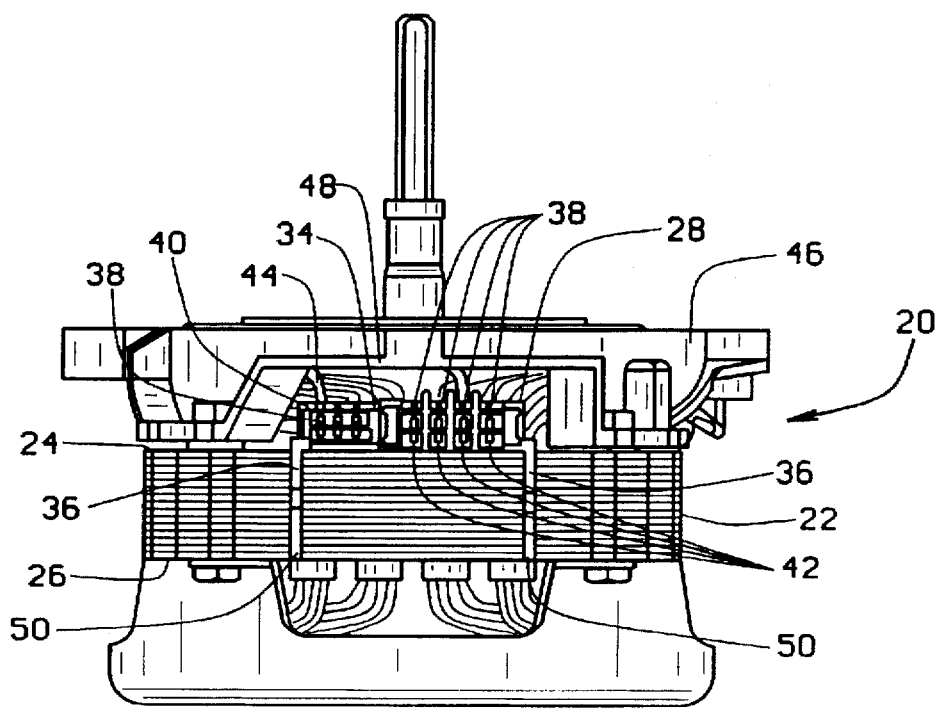
FIG. 2 is a side elevation view of the motor (taken from the bottom of FIG. 1), showing the connector block.
Figure 3:
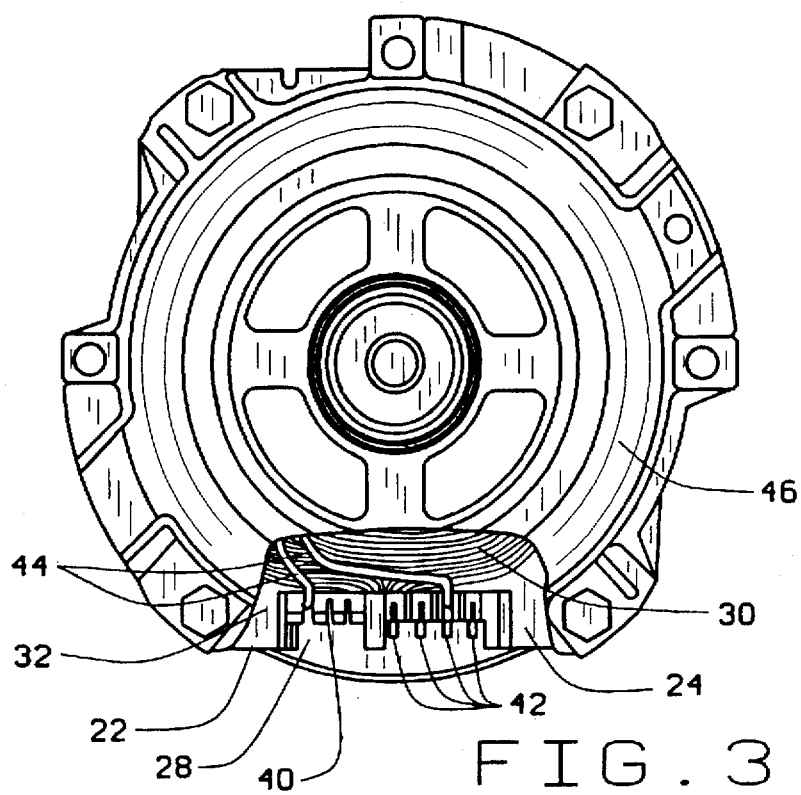
FIG. 3 is a top plan view of the motor with the portion of the end shield over the connector block broken away to show the placement of the connector block.
Figure 4:
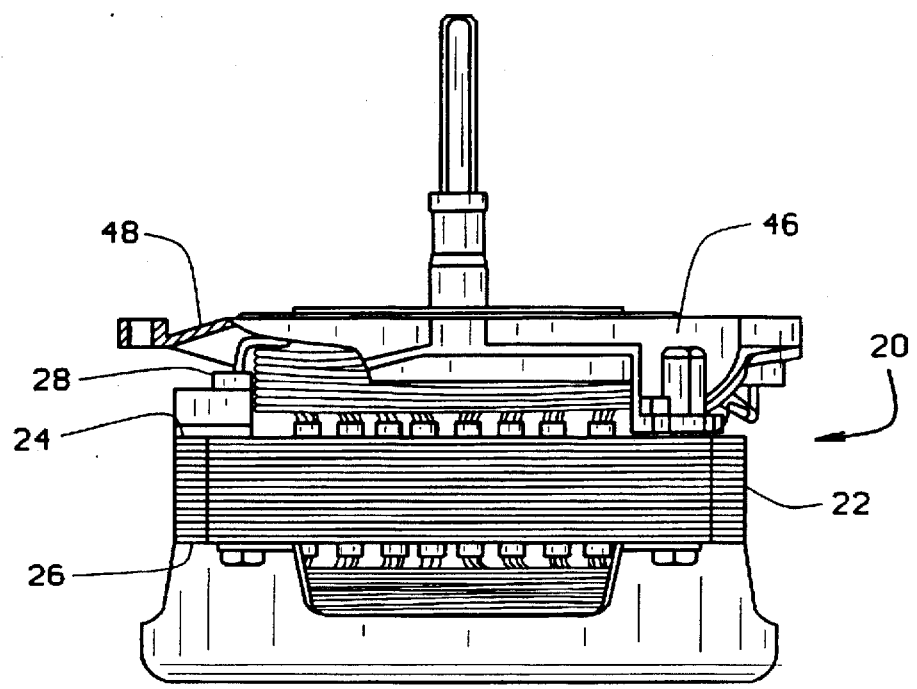
FIG. 4 is a side elevation view of the motor (take from the right in FIG. 3), with a portion of the end shield broken away to show the position of the connector block.

An electric motor constructed according to the principles of this invention is indicated generally as 20 in the Figures. The motor 20 comprises a stator 22 with a stack of laminations forming a core, as shown in FIGS. 2 and 4, having a top end 24 and a bottom end 26, and a transverse cross-sectional profile. In this preferred embodiment the transverse cross-sectional profile of the stator is substantially square having four flat faces. According to the principles of this invention, a connector block 28 is mounted on one end of stator, and is positioned so that the block 28 is substantially entirely within the transverse cross-sectional profile of the stator 22.

The connector block 28 is preferably positioned on the stator 28 at a position between the windings 30 of adjacent poles. As shown and described herein the motor 20 is a two pole motor, but the invention is not so limited and applies to motors with a greater number of poles. However in motors with a greater number of poles the windings tend to fill the space between adjacent poles, so that stator must be made larger to provide sufficient room on the stator to accommodate the connector block 28. As shown in Figures, the motor 20 has spaces 32 between the windings forming the two poles, and the connector block 28 is positioned in one of these spaces, which is preferably aligned with one of the flat sides of the stator.

The connector block 28 comprises a body 34 having depending feet 36 and a plurality of compartments 38 for mounting a common connection 40 (for making internal connections) and a plurality of contacts 42. The contacts 42 are mounted in the sockets and are oriented generally transversely outwardly so that the contacts can be engaged by a conventional plug with connectors pushed onto the contacts generally transversely to the motor. Lead wires and magnet wires 44 from the windings of the stator extend through slots in the connector block to the socket 40 and the contacts 42.

Figure 1:
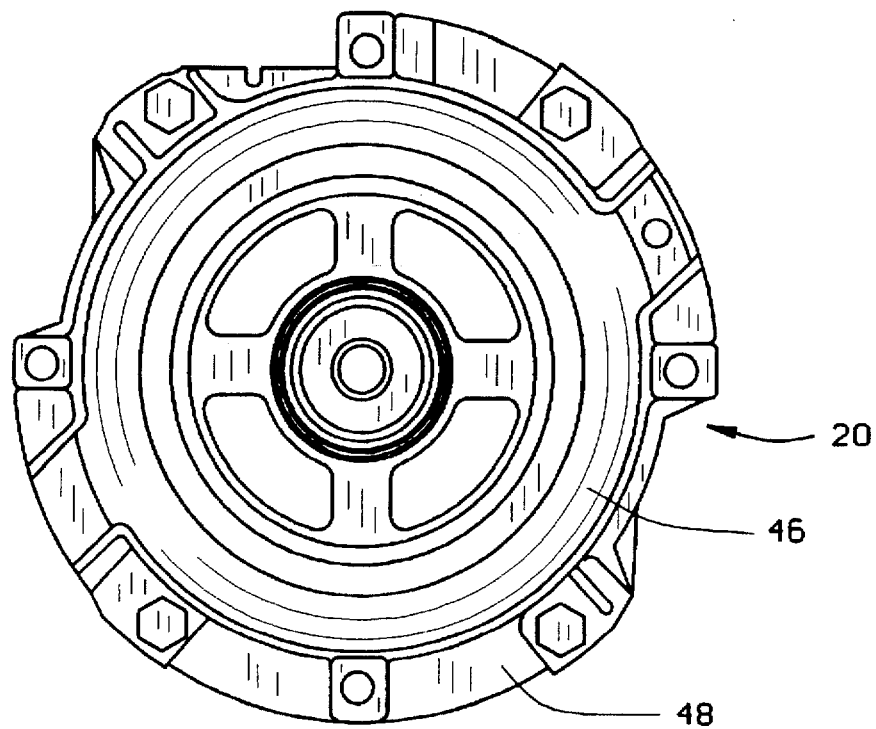
FIG. 1 is a top plan view of a motor with a connector block strategically placed in accordance with the principles of this invention.

An end shield 46 is mounted over the end of the stator 22 and extends over the connector block 28. In the vicinity of the connector block 28 the end shield 46 is spaced sufficiently from the stator to allow transverse access to the connector block, and in particular to the socket 40 and contacts 42 in the compartments 38 of the connector block. As shown in FIG. 1, the end shield 46 preferably has an eye-brow shaped flare 48 over the connector block 28 to provide access to the connector block. The flare 48 projects transversely outwardly beyond the stator 22.

During manufacture, because of the force required to properly seat the socket 40 and contacts 42 in the compartments 38, the connector block 28 is supported above the stator 22, with the compartments sockets oriented generally upwardly. The lead wires and magnetic wires 44 and the socket 40 and contacts 42 are installed in the compartments 38, and the connector block 28 is rotated 90° to bring the feet 36 into vertically-extending grooves 50 in the side of the stator 22. Some of the laminations on the stator are then deformed adjacent the grooves to secure the feet 36 in the grooves 50.

OPERATION

Because of the strategic positioning of the connector block on the stator 22, the motor 20 can be handled by robots or manually with minimal risk of damaging the connector block. The connector block 28 is shielded between the stator 22 and the end shield 46, however, the connector block is readily accessible to connector plug wires inserted transversely with respect to the motor to make electrical contact with the contacts 42.

Thus the motor 20 has a connector block that allows fast, convenient and secure connection, with improved protection of the connector block from damage both from handling during the manufacturing process and from in-service abuse.

What is claimed is:

1. An electric motor comprising:
    a stator having a stack of laminations with first and second ends and a cross section;
    a connector block mounted on one end of the stator, substantially entirely within the cross-section of the stator, the connector block having a plurality of compartments oriented generally radially outward with respect to the stator;
    electrical contacts in at least some of the compartments; and
    an end shield mounted over the end of the stator, the shield overlying the connector block, but spaced sufficiently from the stator in the vicinity of the connector block to allow free access to the electrical contacts in the compartments in the connector block from a generally radial direction.

2. The electric motor according to claim 1 wherein the stator comprises windings having 100 ps for at least two poles disposed in a plurality of slots in the stator, the loops of the windings protruding from the ends of the stator, the connector block being positioned on an end of the stator, between the windings of adjacent poles.

3. The electric motor according to claim 1 wherein the cross-section of the stator is generally rectangular, having four faces.

4. In an electric motor having a stator having a stack of laminations with first and second ends and a cross-sectional profile, and an end shield mounted over at least one of the ends of the stator, the improvement comprising a connector block mounted on the end of the stator between the stator and the end shield, the connector block being positioned substantially entirely within the cross-sectional profile of the stator, and the connector block having electrical contacts mounted in compartments oriented generally radially outwardly, the connector mounting block being accessible through a gap between the stator and the end shield.

5. The electric motor according to claim 4 wherein the stator comprises windings having loops for at least two poles disposed in a plurality of slots in the stator, the loops of the windings protruding from the ends of the stator, the connector block being positioned on an end of the stator, between the windings of adjacent poles.

6. The electric motor according to claim 4 wherein the connector block has at least one foot projecting from its lower surface, and wherein the stator has a slot in its side for receiving the foot.

7. The electric motor according to claim 6 wherein the stator comprises windings having loops for at least two poles disposed in a plurality of slots in the stator, the loops of the windings protruding from the ends of the stator, the connector block being positioned on an end of the stator, between the windings of adjacent poles.

8. The electric motor according to claim 4 wherein the cross-sectional profile of the stator is generally rectangular, having four faces.

9. An electric motor adapted for robotic installation in an appliance, the motor comprising a stator having a stack of laminations with first and second ends and a cross-sectional profile, an end shield mounted over one end of the stator, and a connector block on the end of the stator positioned between the end shield and the stator, substantially entirely within the cross sectional profile of the stator, the connector block having generally transversely accessible electrical contacts.

10. The electric motor according to claim 9 wherein the stator comprises windings having loops for at least two poles disposed in a plurality of slots in the stator, the loops of the windings protruding from the ends of the stator, the connector block being positioned on an end of the stator, between the windings of adjacent poles.

11. The electric motor according to claim 9 wherein the cross-sectional profile of the stator is generally rectangular having four faces.

* * * * *